United States Patent
DeWitte (10) Patent No.: US 8,221,165 B2
(45) Date of Patent: Jul. 17, 2012

(54) CONNECTOR ASSEMBLY WITH AN INTEGRATED FUSE

(75) Inventor: Thomas Robert DeWitte, Shelby Township, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 303 days.

(21) Appl. No.: 12/644,289

(22) Filed: Dec. 22, 2009

(65) Prior Publication Data

US 2011/0151719 A1   Jun. 23, 2011

(51) Int. Cl.
*H01R 13/68* (2011.01)
(52) U.S. Cl. .................................. 439/620.26
(58) Field of Classification Search ............. 439/620.26
See application file for complete search history.

(56) References Cited

U.S. PATENT DOCUMENTS

| | | | |
|---|---|---|---|
| 3,486,154 A * | 12/1969 | Seagrave et al. | 337/188 |
| 3,697,932 A | 10/1972 | Keto et al. | |
| 4,408,822 A | 10/1983 | Nikitas | |
| 4,426,127 A | 1/1984 | Kubota | |
| 4,721,481 A | 1/1988 | Grellmann et al. | |
| 7,613,003 B2 | 11/2009 | Pavlovic et al. | |
| 2003/0001715 A1 | 1/2003 | Montague | |

FOREIGN PATENT DOCUMENTS

| | | |
|---|---|---|
| DE | 19727453 A | 1/1999 |
| GB | 2284510 A | 6/1995 |

* cited by examiner

*Primary Examiner* — Tho D Ta (57) ABSTRACT

A connector assembly includes a housing, an input conductor, and an output conductor. The housing is configured to mate with a mating connector. The input conductor is held in the housing and extends between a receiving end and a coupling end. The receiving end is configured to receive electric current from a power source. The coupling end is configured to join with a fuse inside the housing. The output conductor is held in the housing and extends between a transmission end and a joining end. The joining end is configured to couple with the fuse inside the housing. The transmission end is configured to convey the electric current to a first electric load. The input conductor and the output conductor are electrically coupled with one another via the fuse to provide a fused conductive pathway within the connector assembly over which the electric current passes from the power source to the first electric load.

19 Claims, 9 Drawing Sheets

CONNECTOR ASSEMBLY WITH AN INTEGRATED FUSE

BACKGROUND OF THE INVENTION

The present disclosure relates to a connector assembly, and more particularly, to a header connector assembly that provides fuses to protect electronic devices from surges in electric current.

Increased fuel costs and increased efforts at reducing environmental pollution have lead the automotive industry towards electric and hybrid electric vehicles (HEV). One design aspect of these vehicles is the use of relatively high operating voltage. Consequently, specific components of the vehicles must be designed to accommodate the high current that is used to transmit the high operating voltages. The electrical assemblies of these vehicles include components that operate at high voltages and require connectors that include high voltage pathways for transmitting the high current. For example, some known electrical vehicular assemblies include components that operate using up to 600 volts or at least 50 amps.

In connector applications that use high voltage, special requirements exist for providing safety to users and to prevent damage to other assembly components and the connectors themselves. For example, if a connector is unmated under active high voltage current, at the instant the mating conductors of the high voltage connector disconnect, high voltage surges may cause severe damage to the connector and/or components that are receiving the current. Consequently, in some applications, a high-voltage interlock (HVIL) circuit is used to protect the connectors and other assembly components from damage due to the high voltage power. An HVIL circuit controls the high voltage circuit so that the high voltage current is not active at the mating and unmating of high voltage conductors in the connectors that mate to convey the high current. In an HVIL circuit, the sequence of mating and unmating the high voltage conductors and the opening and closing of the HVIL circuit is controlled to stop the transmitting of high current prior to decoupling the conductors in the mating connectors and to begin transmission of high current and/or high voltage through the conductors only after the conductors are mated with one another.

Many known high voltage connectors are coupled with fuses to provide additional safeguards against power surges. For example, some known connector assemblies that mate with mating connectors may be mounted to an automotive component, such as a power distribution module, that receives and/or delivers electric current to electrical loads of the automobile. The connector assemblies may be coupled with fuses located inside the power distribution module and away from the header assembly that is mounted to the module such that electric current that passes through the header assembly from an external mating connector is conveyed across one or more of the fuses inside the module prior to being transmitted to one or more electric loads within the module.

One problem is that locating and/or installing the fuses inside the modules may increase the complexity and or the cost of the circuit. Some known fuses are mounted to a circuit board or other device that is internal to the power distribution module. If no other components are mounted to the circuit board, the mounting of the fuses to the circuit boards increases the cost of the automotive component as the circuit boards must be added to the component. Alternatively, in components that already have circuit boards, the mounting of the fuses to the circuit boards may consume valuable real estate on the circuit boards. Additionally, in order to transmit the current received by the header assembly to the fuses inside the module, additional conductive pathways, such as conductive wires, must be added to the module in order to electrically couple the conductors in the header assembly with the fuses.

Another problem is that some known modules receive relatively high current and distribute the current among several other modules and/or electric loads. For example, a module may receive current through a header assembly and convey the current across several conductors located inside the module and separate from the header assembly. The conductors are used to divide the current before distributing the current among electric loads located within or outside of the module. The inclusion of these conductors inside the module can increase the cost and/or complexity of the module.

BRIEF DESCRIPTION OF THE INVENTION

One solution is provided by a connector assembly as described herein that incorporates or integrates the fuses into the connector assembly. In one embodiment, a connector assembly is provided. The connector assembly includes a housing, an input conductor, and an output conductor. The housing is configured to mate with a mating connector. The input conductor is held in the housing and extends between a receiving end and a coupling end. The receiving end is configured to receive electric current from a power source. The coupling end is configured to join with a fuse inside the housing. The output conductor is held in the housing and extends between a transmission end and a joining end. The joining end is configured to couple with the fuse inside the housing. The transmission end is configured to convey the electric current to a first electric load. The input conductor and the output conductor are electrically coupled with one another via the fuse to provide a fused conductive pathway within the connector assembly over which the electric current passes from the power source to the first electric load.

In another embodiment, another connector assembly is provided. The header connector assembly includes a housing, an input conductor, and an output conductor. The housing is configured to mate with a mating connector. The input conductor is held in the housing and extends between opposite ends. One of the opposite ends includes a receiving end and the other end includes a coupling end and a supply end. The receiving end is configured to receive electric current from a power source. The coupling end is configured to join with a fuse inside the housing. The supply end is configured to be electrically coupled with a first electric load. The output conductor is held in the housing and extends between a transmission end and a joining end. The joining end is configured to couple with the fuse inside the housing. The transmission end is configured to convey the electric current to a second electric load. The input conductor and the output conductor are electrically coupled with one another via the fuse. The input conductor splits the electric current from the power source between the first electric load via the supply end and the second electric load via the fuse and the output conductor.

DETAILED DESCRIPTION OF THE INVENTION

Figure 1:
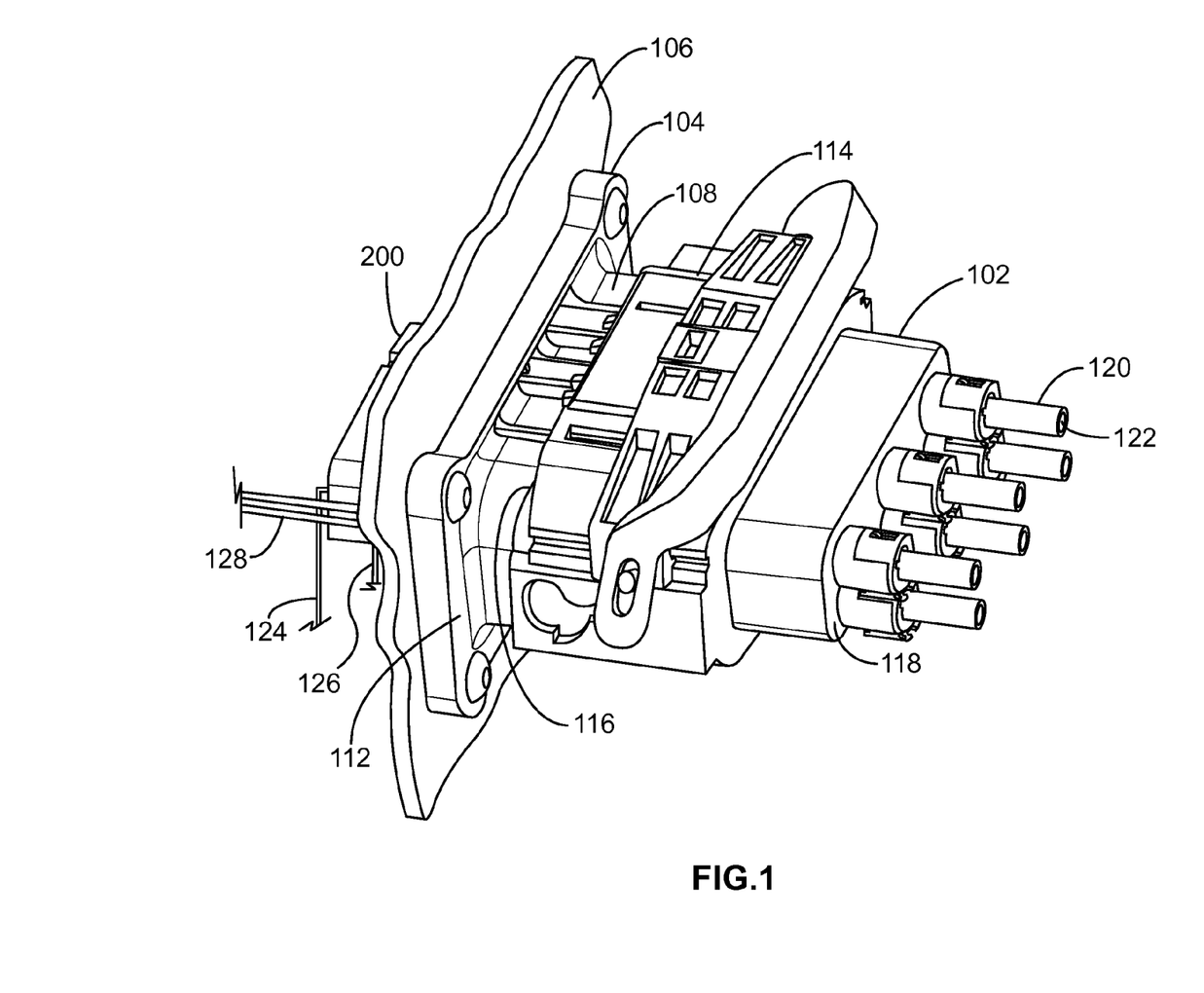
FIG. 1 is a perspective view of a connector assembly coupled with a mating connector in accordance with one embodiment of the present disclosure.

FIG. 1 is a perspective view of a connector assembly 104 coupled with a mating connector 102 in accordance with one embodiment of the present disclosure. As described below, the connector assembly 104 may be a high voltage connector that internally integrates fuses into the connector assembly 104. Alternatively, the connector assembly 104 is a non-high voltage connector. The connector assembly 104 receives electric current from a power source. The electric current is conveyed through the connector assembly 104 and across one or more fuses located inside the connector assembly 104. In one embodiment, the connector assembly 104 may divide and distribute the current among several conductive pathways, some of which are fused pathways that include fuses internal to the connector assembly 104 and some of which are unfused pathways that do not include fuses inside the connector assembly 104. The current may pass through the fuses and exit the connector assembly 104 to any of a variety of electrical loads that use the current to power the loads. The fuses may protect the electrical loads, wires, cables, and other conductors from high power surges in the current. The integration of the fuses inside the connector assembly 104 may eliminate additional components that may otherwise be necessary for introducing fuses to a circuit that includes the connector assembly 104.

In the illustrated embodiment, the connector assembly 104 is a header connector assembly that is mounted to a module or panel 106. In the alternative, the connector assembly 104 may not be mounted in or on a module or panel. The panel 106 may be the exterior surface of an electrical module 900 (shown in FIG. 9), such as a power distribution module, motor, battery pack, and the like. The connector assembly 104 is mounted to the panel 106 such that the mating connector 102 mates with the connector assembly 104 outside of the panel 106. The mating connector 102 shown and described herein is provided merely as an example and is not intended to be limiting on the scope of the embodiments described herein. Different mating connectors may be used to mate with the connector assembly 104 in order to transfer current from the power source 916 (shown in FIG. 9) to the connector assembly 104.

Figure 9:
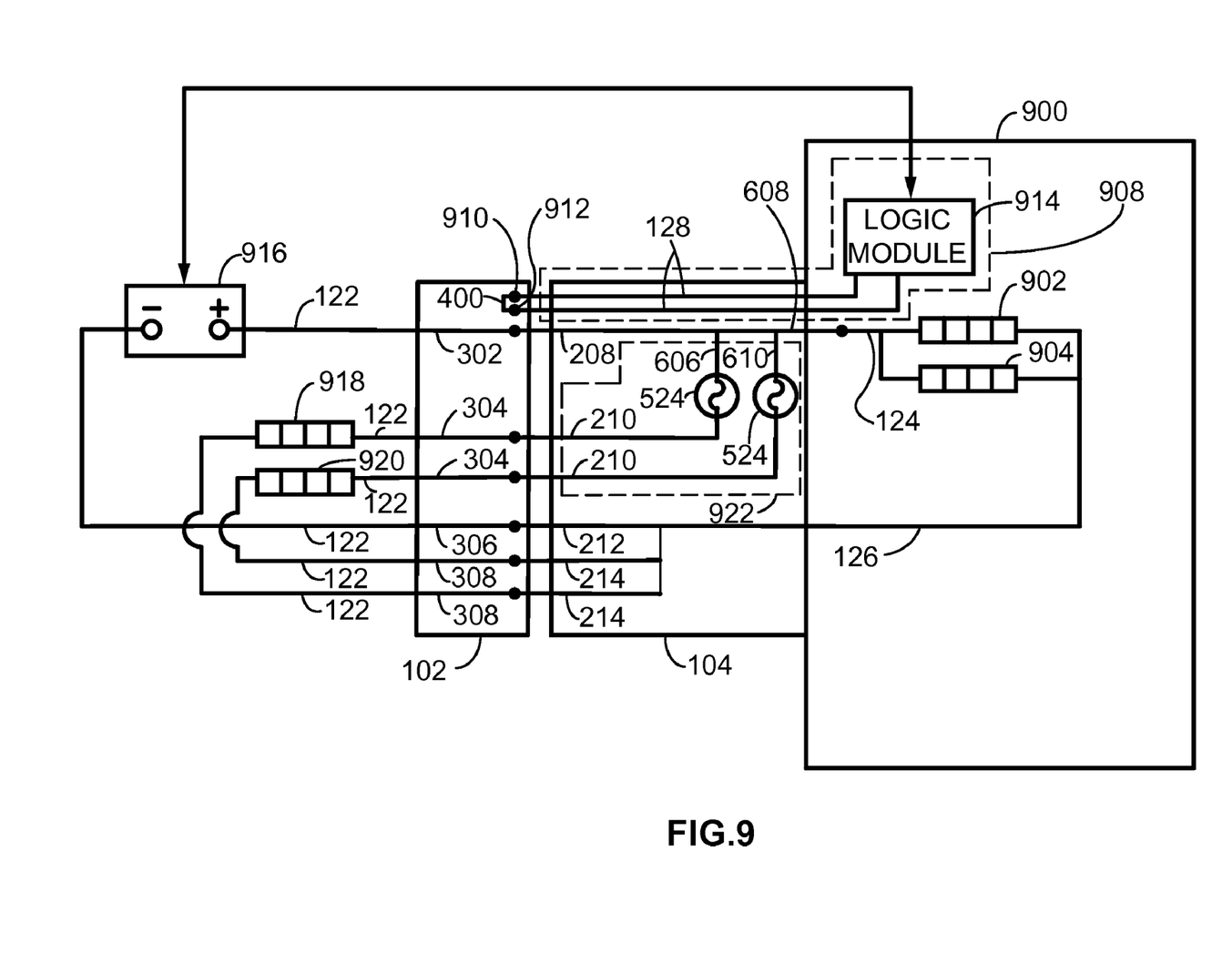
FIG. 9 is a schematic diagram of the mating connector and the connector assembly shown in FIG. 1 in accordance with one embodiment of the present disclosure.

The embodiments described herein disclose a mating connector 102 that is coupled with a power source 916 (shown in FIG. 9). The electric current is supplied to the mating connector 102 from the power source 916. The mating connector 102 couples with the connector assembly 104 to transfer the current to the connector assembly 104. The connector assembly 104 receives the current and internally distributes the current among several conductive pathways. One or more of the pathways includes a fuse 524 inside the connector assembly 104 and one or more of the pathways do not include any fuses 524 inside the connector assembly 104. In the illustrated embodiments, some the current passing through the fuses 524 is transmitted back to the mating connector 102 via the coupling of different conductors that delivered the current from the mating connector 102 to the connector assembly 104. Another portion of the current that is not passed through fuses 524 inside the connector assembly 104 may be conveyed from the connector assembly 104 to an electric load located inside the module 900 (shown in FIG. 9).

The connector assembly 104 includes an outer housing 108. The outer housing 108 is an elongated body with an approximate rectangular cross-section in the illustrated embodiment. A flange 112 outwardly projects from the outer housing 108. The flange 112 may be joined to the panel 106 to secure the connector assembly 104 to the panel 106. The inner housing 200 is disposed within the outer housing 108. As shown in FIG. 1, the outer housing 108 may be mounted to the panel 106 with the outer housing 108 projecting from the panel in one direction, such as, external or on the outside the module and the inner housing 200 projecting from the panel 106 in an opposite direction, such as internal or into the module.

Several conductors may be located within the module 900 (shown in FIG. 9) and electrically joined with conductors of the connector assembly 104. These conductors may include an internal power conductor 124 and an internal ground conductor 126. The internal power conductor 124 conveys electric current from the power source 916 (shown in FIG. 9) to one or more other electric loads 902, 904 (shown in FIG. 9) via or through the connector assembly 104. The internal ground conductor 126 may electrically couple one or more conductors in the connector assembly 104 with a ground reference.

In one embodiment, the connector assembly 104 includes interlock conductors 128 that extend into the module 900 (shown in FIG. 9). Alternatively, the connector assembly 104 does not include the interlock conductors 900. The interlock conductors 128 may be part of an interlock circuit 908 (shown in FIG. 9) such as a high voltage interlock (HVIL) circuit. The interlock circuit 908 is closed after the mating connector 102 mates with the connector assembly 104 and is opened prior to the unmating of the connector assembly 104 and the mating connector 102. The interlock circuit 908 may control the transfer of electric current between the mating connector 102 and the connector assembly 104 using interlock conductors 216 (shown in FIG. 2) so that high power is transferred between the mating connector 102 and the connector assembly 104 only when the interlock circuit 908 is closed.

The mating connector 102 includes an outer housing 114 that longitudinally extends between a front end 116 and a back end 118. The front end 116 engages and mates with the front end 204 (shown in FIG. 2) of the connector assembly 104 to couple the mating connector 102 with the connector assembly 104. In the illustrated embodiment, the mating connector 102 includes several cables 120 extending from the back end 118. The cables 120 may include conductors 122 that are electrically joined with conductors 302, 304, 306 and 308 (shown in FIG. 3) of the mating connector 102.

Figure 2:
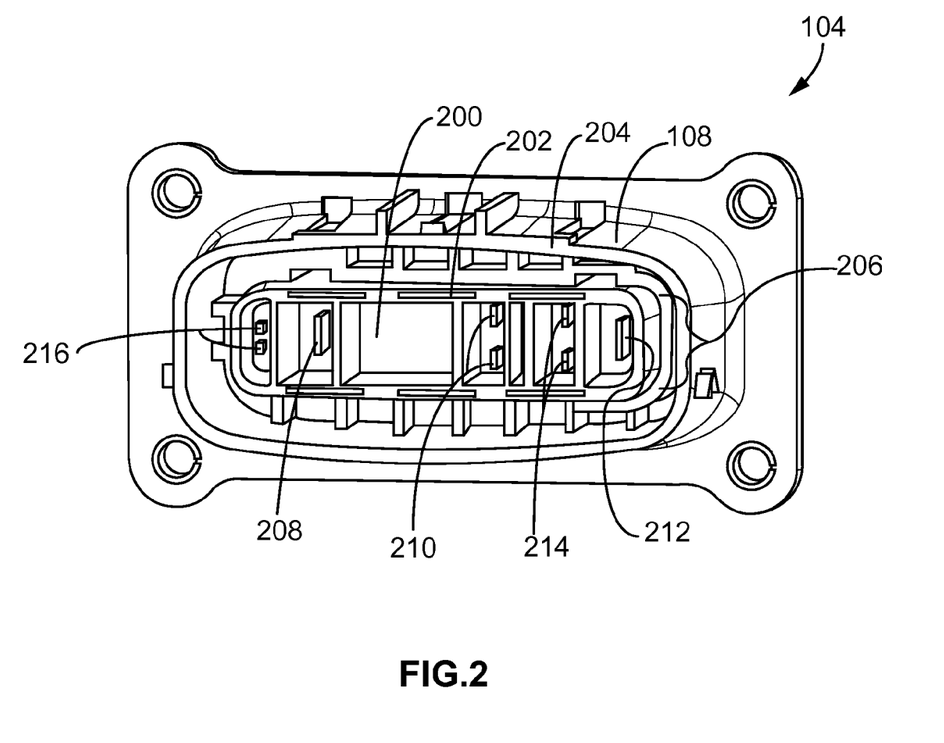
FIG. 2 is a perspective view of the connector assembly shown in FIG. 1 in accordance with one embodiment of the present disclosure.
Figure 3:
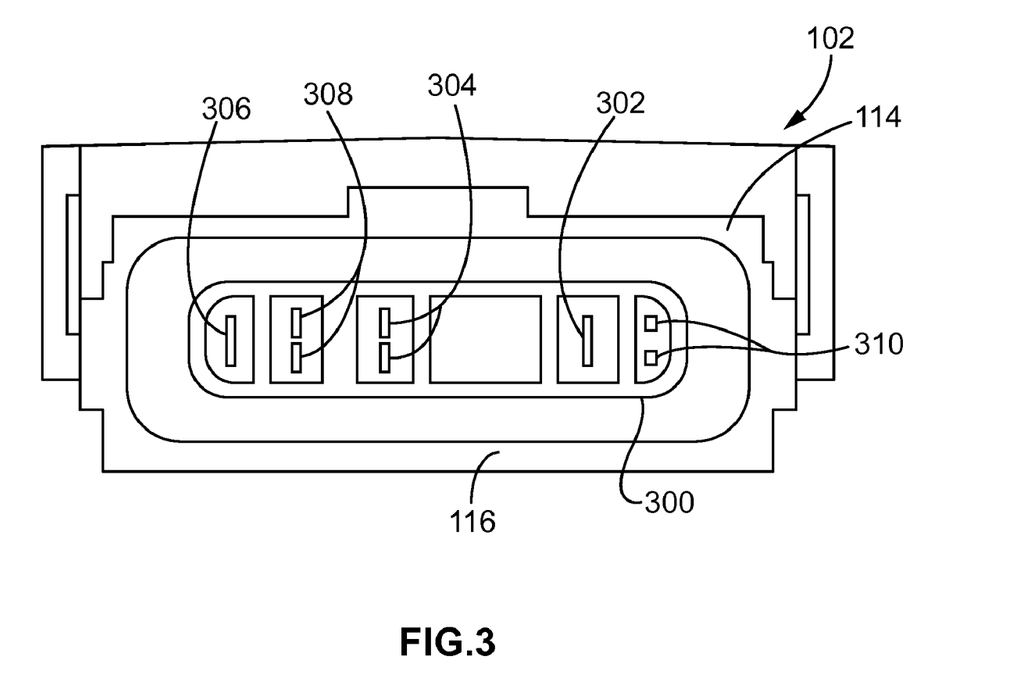
FIG. 3 is a plan view of a mating connector shown in FIG. 1 in accordance with one embodiment.

FIG. 2 is a front perspective view of the connector assembly 104 in accordance with one embodiment of the present disclosure. FIG. 3 is a front view of the mating connector 102 in accordance with one embodiment. FIGS. 2 and 3 illustrate one embodiment of the layout or arrangement of several conductors 302, 304, 306, 308 and 208, 210, 212, 214 in the connector assembly 104 and the mating connector 102, respectively. As described below, various other combinations of the conductors 208, 210, 212, 214, 302, 304, 306, 308 may mate with one another to electrically couple the connector assembly 104 and the mating connector 102 and transfer electric current therebetween.

With respect to FIG. 2, the connector assembly 104 includes an inner housing 200 disposed within an electromagnetic shield 202. The inner housing 200 and electromagnetic shield 202 are located within the outer housing 108. Alternatively, the connector assembly 104 includes only a single housing as opposed to both the inner and outer housings 200, 108. In another embodiment, the connector assembly 104 does not include the electromagnetic shield 202. As shown in FIG. 2, the outer housing 108 forms a shroud that surrounds the perimeter or outer periphery of the inner housing 200 and electromagnetic shield 202 along the front end 204 of the outer housing 108. The conductors 208, 210, 212, 214, 216 are disposed within the inner housing 200. The inner housing 200 forms a connection bay 206 that presents the conductors 208, 210, 212, 214, 216 for mating with corresponding conductors 302, 304, 306, 308, 310 (shown in FIG. 3) of the mating connector 102 (shown in FIG. 1) outside of the panel 106 (shown in FIG. 1). While only a single connection bay 206 is shown in the illustrated embodiment, alternatively, several connection bays 206 may be provided. For example, the connector assembly 104 may include a larger number of connector bays 206 that permit the connector assembly 104 to mate with several mating connectors 102 at the same time. In one embodiment, a first connection bay 206 may be configured to mate with a first mating connector 102. A different second connection bay 206 may be configured to mate with a second, different mating connector 102. One end of one or more of the conductors 208, 210, 212, 214 may be presented in one of the connection bays 206 while a different end of the same conductor 208, 210, 212, 214 may be presented in another one of the connection bays 206 to electrically couple the two mating connectors 102. In another embodiment, a first conductor 208, 210, 212, 214 is presented in one connection bay 206 and is electrically joined with a second, different conductor 208, 210, 212, 214 that is presented in a different connection bay 206. The first and second conductors 208, 210, 212, 214 mate with different mating connectors 102 at the different connection bays 206.

An input conductor 208 is disposed within the connection bay 206. The input conductor 208 is a conductive body that is formed from one or more metals or metal alloys. In one embodiment, the input conductor 208 is a bus bar that is stamped and formed from a common sheet of conductive material. In the illustrated embodiment, the input conductor 208 forwardly projects toward the front end 204 of the outer housing 108 to mate with a supply transmission conductor 302 (shown in FIG. 3) of the mating connector 102 (shown in FIG. 1) when the mating connector 102 engages the connector assembly 104 from outside of the module 900 (shown in FIG. 9). The supply transmission conductor 302 is joined with the power source 916 (shown in FIG. 9) and receives current from the power source 916. The supply transmission conductor 302 transfers the current to the input conductor 208 when the mating connector 102 is mated with the connector assembly 104. Alternatively, a power source such as a battery may be internally located within the module 900 (shown in FIG. 9) to which the connector assembly 104 is mounted. The input conductor 208 may be joined with the internal power source of the module 900 and may receive electric current from the internal power source instead of the mating connector 102.

Two output conductors 210 are provided in the connection bay 206. The output conductors 210 are conductive bodies that are formed from one or more metals or metal alloys. In one embodiment, the output conductors 210 are physically and electrically separate from one another. For example, each of the output conductors 210 may be a bus bar that is stamped and formed from a sheet of conductive material. Alternatively, different conductive bodies may be used in place of the output conductors 210. A different number of output conductors 210 may be provided. In the illustrated embodiment, the output conductors 210 forwardly project toward the front end 204 of the outer housing 108.

Also as described below, the current that is received by the input conductor 208 of the connector assembly 104 is transmitted through fuses 524 (shown in FIG. 5) that are located within the connector assembly 104 and coupled to the input conductor 208. The output conductors 210 also are joined with the fuses 524 such that the output conductors 210 receive the current transmitted through the fuses 524. The output conductors 210 convey this current from within the connector assembly 104 to another component, such as the mating connector 102 (shown in FIG. 1). For example, the output conductors 210 may mate with split conductors 304 (shown in FIG. 3) in the mating connector 102 to transmit the current to the split conductors 304 of mating connector 102. Alternatively, the output conductors 210 may mate with conductors or contacts of another connector, device, or electric load, such as the loads 902, 904 (shown in FIG. 9) to transfer the current to the conductors or contacts of the other connector, device, or load.

In the illustrated embodiment, a ground feed conductor 212 and a pair of ground transfer conductors 214 are included in the connection bay 206. Alternatively, one or all of the ground feed conductor 212 and the ground transfer conductors 214 are not provided in the connector assembly 104. In one embodiment, the ground feed conductor 212 and the ground transfer conductors 214 are a single conductive body that is formed from one or more metals or metal alloys. For example, the ground feed conductor 212 and the ground transfer conductors 214 may be a bus bar that is stamped and formed from a common sheet of conductive material. Alternatively, the ground feed conductor 212 and ground transfer conductors 214 may be formed from other conductive pathways, such as wires. In another embodiment, two or more of the ground feed conductor 212 and the ground transfer conductors 214 may be physically and/or electrically separate from one another. In the illustrated embodiment, the ground feed conductors 212 and the ground transfer conductors 214 forwardly project toward the front end 204 and away from a mounting side 504 (shown in FIG. 5) of the outer housing 108.

In one embodiment, the ground feed conductor 212 of the connector assembly 104 mates with the ground feed conductor 306 of the mating connector 102 and the ground transfer conductors 214 of the connector assembly 104 mate with the ground transfer conductors 308 of the mating connector 102. As described below, the ground feed conductor 306 and the ground transfer conductors 308 may be joined with the negative terminal of the power source 916 (shown in FIG. 9). The mating of the ground feed conductor 212 and the ground transfer conductors 214 of the connector assembly 104 with the ground feed conductor 306 and the ground transfer conductors 308 of the mating connector 102 may electrically join the ground feed conductor 212 and the ground transfer conductors 214 of the connector assembly 104 with the negative conductor of the power source 916.

In the illustrated embodiment, interlock conductors 216 are disposed within the connection bay 206. The interlock conductors 216 are conductive bodies, such as wires or bus bars, that are joined with the interlock conductors 128 (shown in FIG. 1). As described below, the interlock conductors 216 mate with a shunt 400 (shown in FIG. 4) of the mating connector 102 (shown in FIG. 1) to bridge or electrically couple the interlock conductors 216 and interlock conductors 128 with one another and to close the interlock circuit 908 (shown in FIG. 9). Alternatively, the interlock conductors 216 may be provided in the mating connector 102 and the shunt 400 is provided in the connector assembly 104. As described herein, the closing of the interlock circuit 908 may control the transmission of electric current between the mating connector 102 and the connector assembly 104. Alternatively, the interlock circuit 908 may not be provided.

With respect to FIG. 3, the mating connector 102 includes an inner housing 300 disposed within the outer housing 114. The outer housing 114 may form a shroud that surrounds the perimeter or outer periphery of the inner housing 300 along the front end 116 of the outer housing 114. The shroud formed by the outer housing 114 may receive the shroud formed by the outer housing 108 (shown in FIG. 1) of the connector assembly 104 (shown in FIG. 1). The inner housing 300 is shaped to mate with the connection bay 206 (shown in FIG. 2) of the connector assembly 104. For example, the inner housing 300 may be sized to engage the inner housing 200 (shown in FIG. 1) of the connector assembly 104.

A transmission conductor 302 is disposed within the inner housing 300. The transmission conductor 302 is a conductive body that is formed from one or more metals or metal alloys. In one embodiment, the transmission conductor 302 is a receptacle or slot disposed in the inner housing 300 that includes, is formed from, or is lined with a conductive material. The transmission conductor 302 receives the input conductor 208 (shown in FIG. 2) of the connector assembly 104 (shown in FIG. 1) to mate the input conductor 208 with the transmission conductor 302. The mating connector 102 may transfer electric potential and/or current to the connector assembly 104 via the coupling of the transmission conductor 302 and the input conductor 208.

Two split conductors 304 are provided in the inner housing 300. Alternatively, a different number of split conductors 304 are provided. The split conductors 304 are conductive bodies that are formed from one or more metals or metal alloys. In one embodiment, the split conductors 304 are separate receptacles disposed in the inner housing 300 that include, are formed from, or are lined with conductive materials. The split conductors 304 receive the output conductors 210 (shown in FIG. 2) of the connector assembly 104 (shown in FIG. 1) to mate the output conductors 210 with the split conductors 304.

The ground feed conductor 306 and a pair of ground transfer conductors 308 are included in the inner housing 300. The ground feed conductor 306 and the ground transfer conductors 308 are conductive bodies that are formed from one or more metals or metal alloys. In one embodiment, the ground feed conductor 306 and the ground transfer conductors 308 are separate receptacles or slots formed in the inner housing 300 that include, or are formed from, or are lined with conductive materials. The ground feed conductor 306 receives the ground feed conductor 212 (shown in FIG. 2) of the connector assembly 104 (shown in FIG. 1) and the ground transfer conductors 308 receive the ground transfer conductors 214 (shown in FIG. 2) of the connector assembly 104 to electrically couple the mating connector 102 with the negative conductor of the power source 916 (shown in FIG. 9) in one embodiment. The connector assembly 104 may transfer electric potential and/or current to the mating connector 102 via the coupling of the output conductors 210 with the split conductors 304, the coupling of the input conductor 208 with the transmission conductor 302, and the coupling of the ground feed conductor 212 with a ground feed conductor 306.

A pair of shunt conductors 310 project from the inner housing 300. The shunt conductors 310 are extensions of the shunt 400 (shown in FIG. 4). The shunt conductors 310 are received in the interlock conductors 216 (shown in FIG. 2) of the connector assembly 104 (shown in FIG. 1). Alternatively, the shunt 400 and shunt conductors 310 may be disposed in the connector assembly 104 and mate with interlock conductors 216 disposed in the mating connector 102. The shunt conductors 310 are received in and couple with the interlock conductors 216 to electrically couple the interlock conductors 128 inside the connector assembly 104 with one another. The coupling of the interlock conductors 128 (shown in FIG. 1) by the shunt conductors 310 closes the interlock circuit 908 (shown in FIG. 9), as described below. For example, the shunt conductors 310 may be electrically common with one another such that the mating of the shunt conductors 310 with the interlock conductors 216 electrically couples the interlock conductors 216 with one another. As described herein, the closing of the interlock circuit 908 by mating the shunt conductors 310 with the interlock conductors 216 may control the transmission of electric current between the mating connector 102 and the connector assembly 104.

Figure 4:
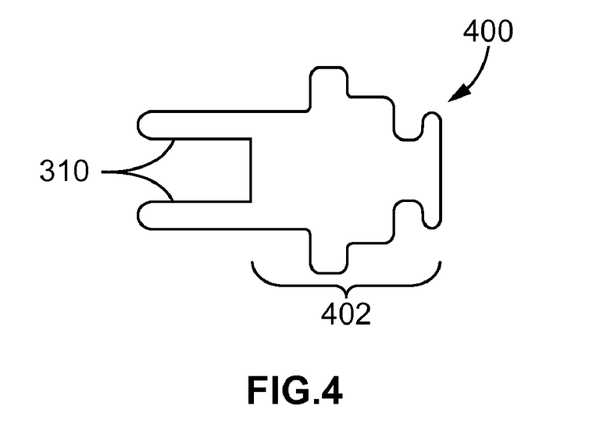
FIG. 4 is a side view of a shunt in accordance with one embodiment of the present disclosure.

FIG. 4 is a side view of the shunt 400 in accordance with one embodiment of the present disclosure. The shunt 400 includes or is formed from a conductive material, such as one or more metals or metal alloys. The shunt 400 includes the shunt conductors 310 that forwardly project from a body 402 of the shunt 400. The body 402 is held in the inner housing 300 (shown in FIG. 3) of the mating connector 102 (shown in FIG. 1) with the shunt conductors 310 forwardly protruding from the inner housing 300. As described above, the shunt conductors 310 may be received in the interlock conductors 216 (shown in FIG. 2) of the connector assembly 104 (shown in FIG. 1) to electrically couple the interlock conductors 216 with one another and the interlock conductors 128 (shown in FIG. 1) with one another.

Figure 5:
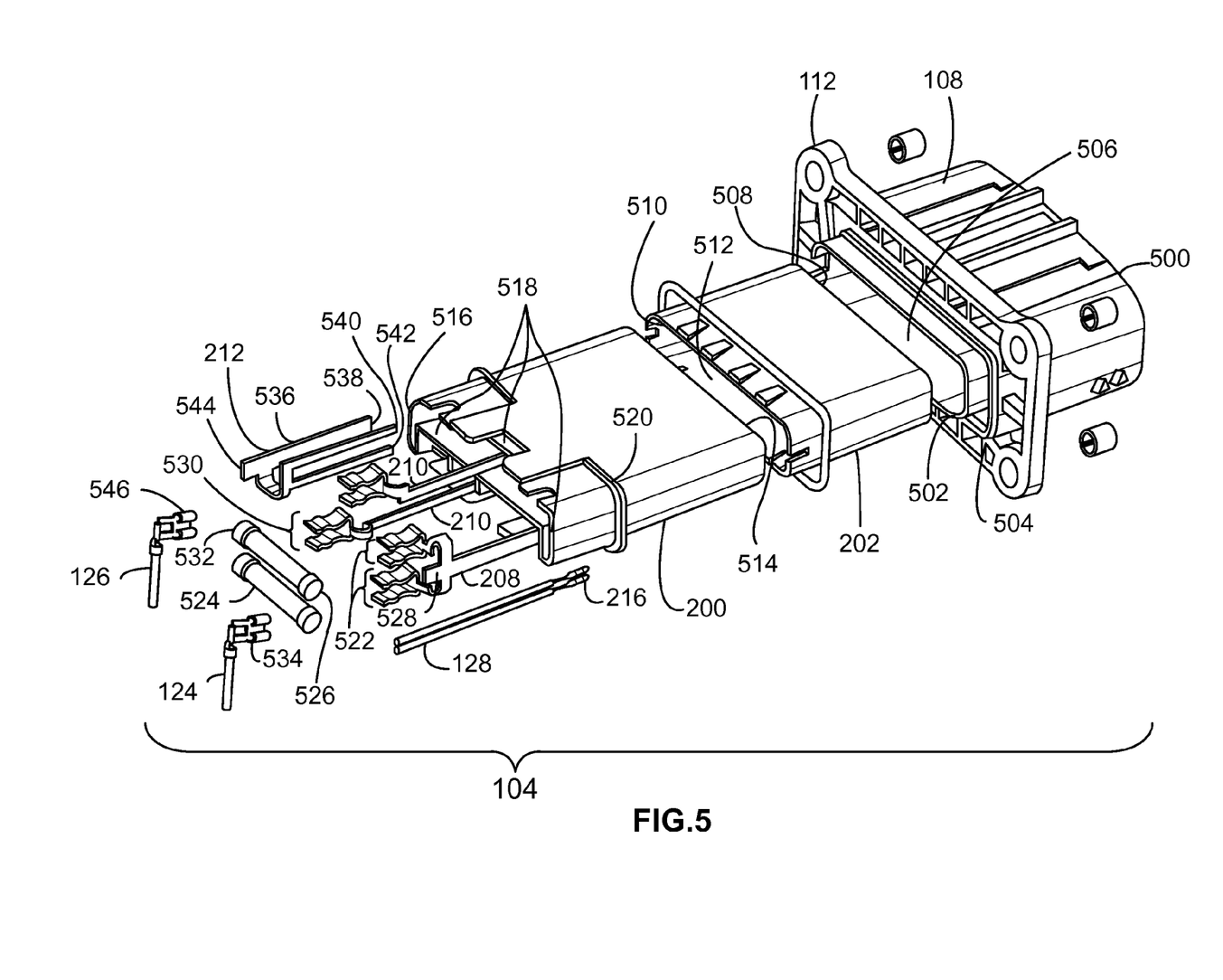
FIG. 5 is an exploded rear view of the connector assembly shown in FIG. 1 in accordance with one embodiment of the present disclosure.

FIG. 5 is an exploded rear view of the connector assembly 104 in accordance with one embodiment of the present disclosure. As shown in FIG. 5, the outer housing 108 is elongated between the front end 500 and an opposite back end 502 with the flange 112 disposed therebetween. The outer housing 108 may include or be formed from one or more dielectric materials, such as one or more polymers. Alternatively, the outer housing 108 may include or be formed from one or more conductive materials, such as a metal or metal alloy. The flange 112 includes a mounting side 504 that abuts the panel 106 (shown in FIG. 1) when the connector assembly 104 is mounted to the panel 106. While the flange 112 is shown mounted to the outside of the module 900 or on the exterior side of the panel 106, alternatively the flange 112 may be mounted on the opposite side of the panel 106. The back end 502 of the outer housing 108 may project from the mounting side 504. The outer housing 108 includes a central passageway 506 that extends through the outer housing 108 from the front end 500 to the back end 502.

The electromagnetic shield 202 is an elongated shell that extends between a front end 508 and an opposite back end 510. The electromagnetic shield 202 is disposed in the central passageway 506 of the outer housing 108. The electromagnetic shield 202 includes, or is formed from, a conductive material such as one or more metals or metal alloys. The electromagnetic shield 202 includes a channel 512 extending through the electromagnetic shield 202 from the front end 508 to the back end 510. The electromagnetic shield 202 may shield the conductors 208, 210, 212, 214, 216 of the connector assembly 104 from electromagnetic interference.

The inner housing 200 is an elongated body that extends between a front end 514 and an opposite back end 516. The inner housing 200 is disposed within the channel 512 of the electromagnetic shield 202. The connection bay 206 (shown in FIG. 2) includes the front end 514. For example, the front end 514 engages the mating connector 102 (shown in FIG. 1) to mate the conductors 302, 304, 306, 308, 310 of the mating connector 102 and the conductors 208, 210, 212, 214, 216 of the connector assembly 104 with one another. The inner housing 200 may include, or be formed from, a dielectric material such as one or more polymers. The inner housing 200 includes several passageways 518 that extend through the inner housing 200. The conductors 208, 210, 212, 214, 216 may be disposed within the passageways 518. A flange 520 may outwardly project from the inner housing 200 between the front end 514 and the back end 516. The flange 520 may engage the back end 510 of the electromagnetic shield 202 and/or the back end 502 of the outer housing 108. For example, the flange 520 may engage the back end 502 of the outer housing 108 such that the portion of the inner housing 200 that extends between the flange 520 and the back end 516 of the inner housing 200 projects away from the outer housing 108.

As described above, the interlock conductors 216 are joined with the interlock conductors 128. Each interlock conductor 216 may be coupled with a different interlock conductor 128. The interlock conductors 216 and interlock conductors 128 may be disposed in one or more of the passageways 518 to present the interlock conductors 216 in the connection bay 206 (shown in FIG. 2) at the front end 514 of the inner housing 200.

The input conductor 208 is disposed within the inner housing 200. The input conductor 208 may be located within one of the passageways 518 of the inner housing 200 such that the input conductor 208 is presented in the connection bay 206 (shown in FIG. 2) to mate with the mating connector 102 (shown in FIG. 1). The input conductor 208 may be a unitary body. By way of example only, the input conductor 208 may be a bus bar that is stamped and formed from a sheet of a metal or metal alloy. The input conductor 208 includes several coupling ends 522 and a supply end 528. While two coupling ends 522 and a single supply end 528 are shown, alternatively a different number of coupling ends 522 and/or supply ends 528 may be provided. The coupling ends 522 are conductive C-shaped receptacles in the illustrated embodiment. Each of coupling ends 522 may receive a different fuse 524. For example, each coupling end 522 may receive a conductive end cap 526 of an elongated fuse 524, such as an AGU fuse.

The fuses 524 may be provided as conductive bodies that fail or open a circuit to which the fuses 524 are joined when the electric current passing through or across the fuse 524 exceeds a predetermined threshold. The fuses 524 may be provided as conductive components that open circuits to which the fuses 524 are joined when the current passing through the fuses 524 is greater than a predetermined threshold, but less than the current threshold of the conductors 208, 210 to which the fuses 524 are joined. For example, the fuses 524 may fail at a lower current than the current at which the conductors 208, 210 fail and/or one or more other electrical components joined with the conductors 208, 210 in order to protect the conductors 208, 210 and/or components from electrical surges.

In the illustrated embodiment, the supply end 528 is formed as a tab projecting from the input conductor 208 between the coupling ends 522. The supply end 528 may be an approximately flat or planar body that rearwardly projects from the input conductor 208. The supply end 528 may be joined with the internal power conductor 124. For example, the internal power conductor 124 may include a receptacle end 534 that is affixed to the supply end 528. The connection between the receptacle end 534 and the supply end 528 electrically couples the input conductor 208 with the internal power conductor 124.

The output conductors 210 are disposed within the inner housing 200. The output conductors 210 may be located within one or more of the passageways 518 of the inner housing 200 such that the output conductors 210 are presented in the connection bay 206 (shown in FIG. 2) to mate with the mating connector 102 (shown in FIG. 1). The output conductors 210 may be separate from one another. For example, when decoupled from the fuses 524 and the input conductor 208, the output conductors 210 may be electrically and physically separate or isolated from one another. Each of the output conductors 210 may be a unitary body. By way of example only, each output conductor 210 may be a bus bar that is stamped and formed from a sheet of a metal or metal alloy.

Each of the output conductors 210 includes a joining end 530. The joining ends 530 of the output conductors 210 may be similar to the coupling ends 522 of the input conductor 208. For example, the joining ends 530 may be C-shaped receptacles. Each of joining ends 530 may receive a different fuse 524. For example, each joining end 530 may receive a conductive end cap 532 of a different fuse 524. The end caps 532 to which the output conductors 210 are joined are opposite the end caps 526 to which the input conductor 208 is coupled. For example, one of the fuses 524 includes one end cap 526 that is received in one of the coupling ends 522 of the input conductor 208 and an opposite end cap 532 that is received in the joining end 530 of one of the output conductors 210. Each of the output conductors 210 may be electrically coupled with the input conductor 208 via a different one of the fuses 524.

The joining of the input conductor 208 to the output conductors 210 by the fuses 524 creates two fused conductive pathways over which electric current and/or potential may be transferred back to the mating connector 102 (shown in FIG. 1). For example, electric current may be received by the input conductor 208 from the mating connector 102. The current may pass through conductive pathways or circuits of the mating connector 102 that do not include fuses. The current passes through the input conductor 208 and the fuses 524 to the output conductors 210. As shown in FIG. 5, the body of the input conductor 208 splits into the two coupling ends 522 and the supply end 528. The splitting of the input conductor 208 divides the current received from the mating connector 102 among the coupling ends 522 and supply end 528. Some of the divided current passes over fused conductive pathways that include the fuses 524 and the output conductors 210. The divided current is then fed back to the mating connector 102 via the output conductors 210. Alternatively, the current may be supplied to another component, such as one or more of the electrical loads 902, 904 (shown in FIG. 9). Some of the divided current may be transferred to the internal power conductor 124 via the supply end 528 and the receptacle end 534 of the internal power conductor 124. The current that passes to the internal power conductor 124 may be used by one or more electric loads 902, 904 (shown in FIG. 9) that are internal to the module 900 (shown in FIG. 9), for example. In another embodiment, one or more of the output conductors 210 may be coupled with an electric load that is internal to the module 900. For example, one or more of the output conductors 210 may not forwardly project from the connector assembly 104 to mate with conductors 304 (shown in FIG. 3) of the mating connector 102. Instead, the output conductor(s) 210 may rearwardly project into the module 900 to be electrically joined with an internal electric load.

In the illustrated embodiment, the connector assembly 104 includes a grounding conductive body 536 that extends from forward outer ends 538, 540, 542 to rear outer end 544. The grounding conductive body 536 may be a unitary conductive body that includes, or is formed from, a conductive material such as a metal or metal alloy. The grounding conductive body 536 may include the ground feed conductor 212 (shown in FIG. 2) and the ground transfer conductors 214 (shown in FIG. 2). For example, the forward outer end 538 may be the ground feed conductor 212 and the forward outer ends 540, 542 may be the ground transfer conductors 214. The rear outer end 544 may be joined with the internal ground conductor 126. For example, the internal ground conductor 126 may include a receptacle end 546 that is affixed to the rear outer end 544. The connection between the receptacle end 546 and the rear outer end 544 may electrically couple the grounding conductive body 536 with the internal ground conductor 126.

Figure 6:
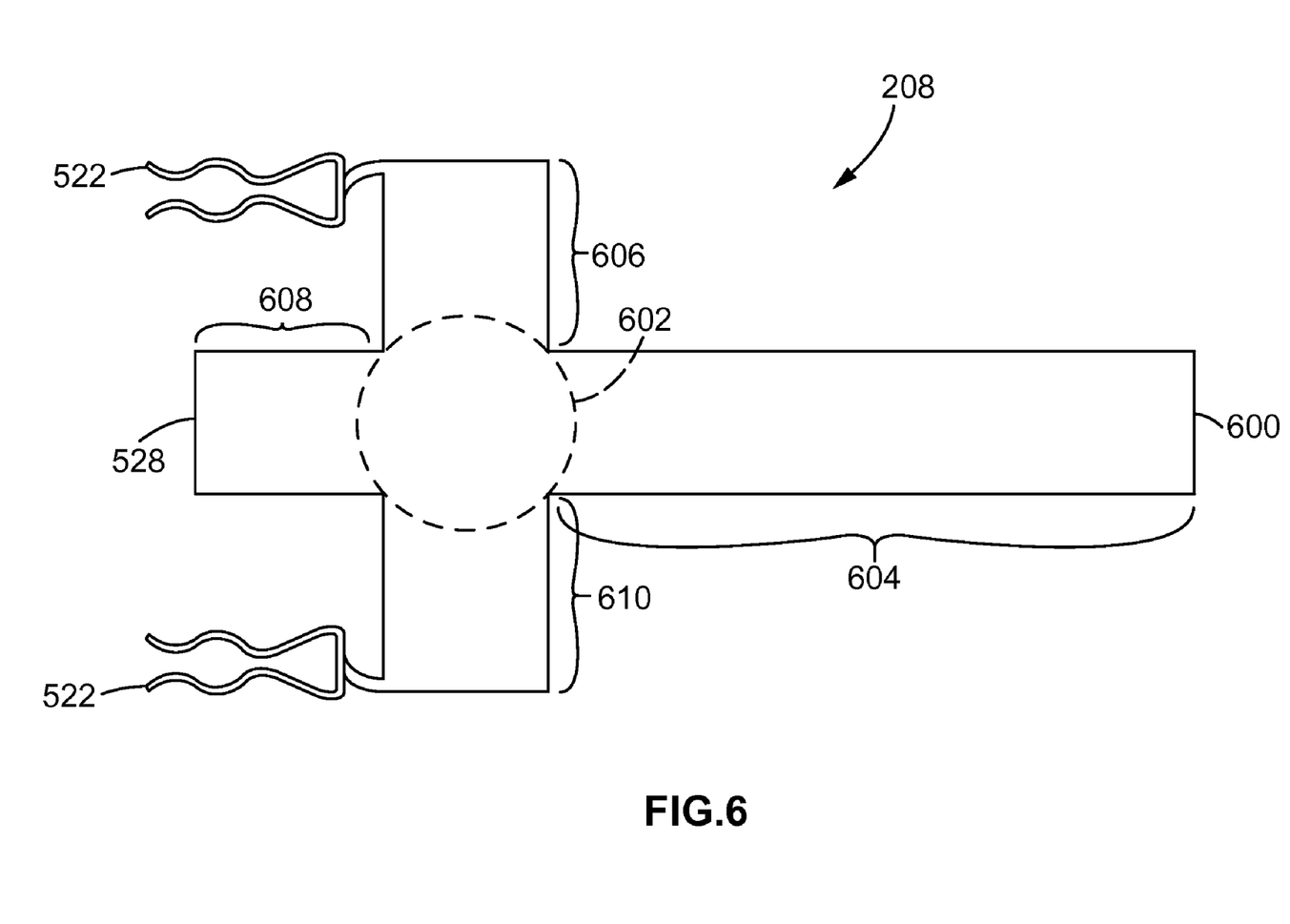
FIG. 6 is a side view of a split conductor shown in FIG. 2 in accordance with one embodiment of the present disclosure.

FIG. 6 is a side view of the input conductor 208 in accordance with one embodiment of the present disclosure. The input conductor 208 is an elongated conductive body that extends from a receiving end 600 to the coupling ends 522 and supply end 528. The receiving end 600 may be the section of the input conductor 208 that mates with the conductor 302 (shown in FIG. 3) of the mating connector 102 (shown in FIG. 1) to receive electric current from the mating connector 102.

The input conductor 208 may be a bus bar that is stamped and formed from a common sheet of metal or metal alloy. The input conductor 208 includes a split 602 between the receiving end 600 and the coupling ends 522 and supply end 528. The input conductor 208 shown in FIG. 6 defines a single conductive pathway 604 that extends from the receiving end 600 to the split 602. The conductive pathway 604 may be considered a single pathway because the conductive pathway 604 is shaped to transfer electric current from the receiving end 600 to the split 602 and does not include any branches or other ends to which the current is transmitted. The split 602 divides the single conductive pathway 604 into multiple conductive pathways 606, 608, 610. In the illustrated embodiment, the input conductor 208 is approximately formed in the shape of a cross, with the single conductive pathway 604 divided into three conductive pathways 606, 608, 610. Alternatively, a different number of pathways 604, 606, 608, 610 may be provided. For example, multiple conductive pathways 604, 606, 608, 610 may be on opposite sides of and connected with the split 602.

The conductive pathways 604, 606 electrically join the receiving end 600 with one of the coupling ends 522. The conductive pathways 604, 608 electrically connect the receiving end 600 with the supply end 528. The conductive pathways 604, 610 electrically join the receiving end 600 with another one of the coupling ends 522. Electric current that is received by the receiving end 600 is split among the conductive pathways 606, 608, 610 and is transmitted to the coupling ends 522 and supply end 528. For example, if 60 amps of current is received by the receiving end 600 from the mating connector 102 (shown in FIG. 1), then the current may be split up and distributed among the conductive pathways 606, 608, 610 to the coupling ends 522 and supply end 528, with each of the two coupling ends 522 and the supply end 528 receiving approximately 20 amps of current. Alternatively, the current may be divided among the conductive pathways 606, 608, 610 by different amounts.

Figure 7:
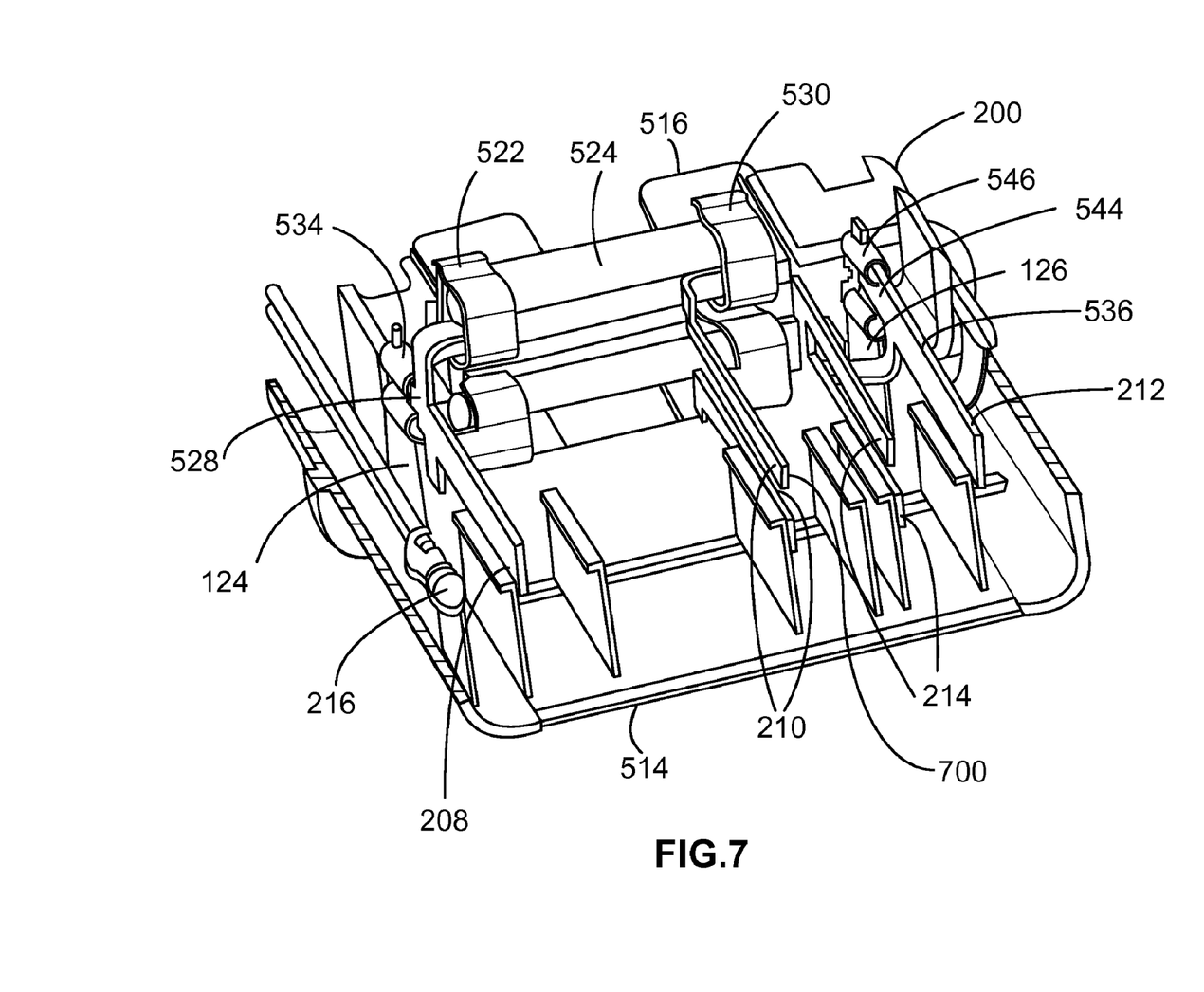
FIG. 7 is a cut-away view of an inner housing of the connector assembly shown in FIG. 1 in accordance with one embodiment of the present disclosure.
Figure 8:
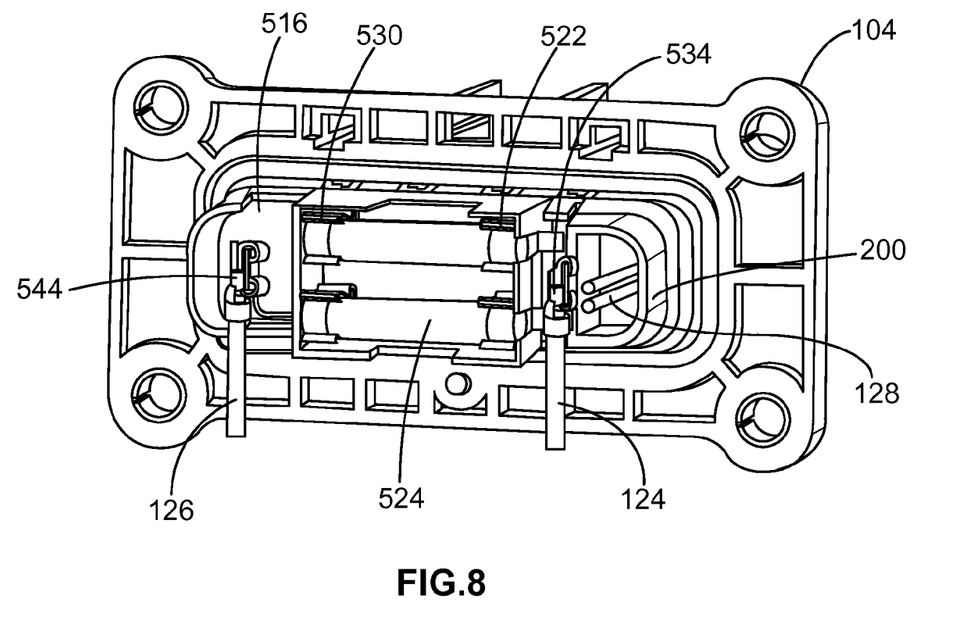
FIG. 8 is a rear view of the connector assembly shown in FIG. 1 in accordance with one embodiment.

FIG. 7 is a cut-away view of the inner housing 200 of the connector assembly 104 (shown in FIG. 1) in accordance with one embodiment of the present disclosure. FIG. 8 is a rear view of the connector assembly 104 in accordance with one embodiment of the present disclosure. As shown in FIGS. 7 and 8, the conductors 208, 210, 212, 214, 216 extend through the inner housing 200 and are presented at or within the front end 514 of the inner housing 200. The output conductors 210 extend between the joining ends 530 and transmission ends 700. The transmission ends 700 mate with the conductors 304 (shown in FIG. 3) of the mating connector 102 (shown in FIG. 1) to convey electric current from the connector assembly 104 to the mating connector 102. The coupling ends 522 and supply end 528 of the input conductor 208 and the joining ends 530 of the transfer conductors 210 are presented at or within the back end 516 of the inner housing 200. The coupling ends 522 and joining ends 530 are accessible via the back end 516 in order to more easily replace the fuses 524. For example, the fuses 524 may be replaced by removing the connector assembly 104 from the panel 106 (shown in FIG. 1), removing the old fuses 524 from the back end 516, and placing new fuses 524 into the coupling ends 522 and joining ends 530. Removal of the connector assembly 104 from the panel 106 may not require opening the module 900 (shown in FIG. 9) to which the connector assembly 104 is mounted. Also as shown in FIGS. 7 and 8, the receptacle end 534 of the internal power conductor 124 is joined with the supply end 528 and the receptacle end 546 of the internal ground conductor 126 is connected with the rear outer end 544 of the grounding conductive body 536.

FIG. 9 is a schematic diagram of the mating connector 102 and the connector assembly 104 in accordance with one embodiment of the present disclosure. The mating connector 102 and connector assembly 104 are shown in a mated relationship with the connector assembly 104 shown mounted to the module 900. The module 900 includes two electrical loads 902, 904, although a different number of loads 902, 904 may be provided. The loads 902, 904 may be referred to as first and second loads 902, 904 and may represent one or more components of a vehicle that operate on electric potential and/or current supplied to the module 900 via the mating connector 102. For example, the loads 902, 904 may represent heating and/or cooling systems, transmission systems, and the like. While the loads 902, 904 are shown as being internal to the module 900, alternatively the loads 902, 904 may be outside of the module 900.

The interlock circuit 908 includes the interlock conductors 128 of the connector assembly 104. The interlock conductors 128 are electrically coupled by the shunt 400 of the mating connector 102 at nodes 910, 912. The interlock circuit 908 is open between the nodes 910, 912 when the mating connector 102 and connector assembly 104 are unmated from one another. For example, the interlock circuit 908 is open between the nodes 910, 912 and across the interlock conductors 128 when the shunt 400 is unmated from the interlock conductors 128. Mating the shunt 400 with the interlock conductors 128 closes the interlock circuit 908 across the nodes 910, 912. The closing of the interlock circuit 908 indicates when the mating connector 102 and the connector assembly 104 are mated. Alternatively, a sensor (not shown), switch (not shown), or other device may be used to determine when the mating connector 102 and the connector assembly 104 are mated.

The module 900 may include a logic device 914 that is electronically coupled with the interlock circuit 908. Alternatively, the logic device 914 may be external to the module 900. The logic device 914 may be embodied in one or more computer logic components, such as a microcontroller, processor, microprocessor, computer, and/or software operating on a processor, microprocessor, computer, sensor, or other hardwired device. The logic device 914 determines when the interlock circuit 908 is open or closed. For example, the logic device 914 may identify when the interlock circuit 908 is open across the nodes 910, 912, thus indicating that the mating connector 102 and the connector assembly 104 are not mated. The logic device 914 may determine that the interlock circuit 908 is open or closed by measuring a potential difference, electrical resistance characteristic, or other electrical characteristic of the interlock circuit 908.

The logic device 914 communicatively coupled with a power source 916, such as a battery, so that the logic device 914 may control the transfer of electric current from the power source 916. The logic device 914 may direct the power source 916 to begin supplying electric current when the interlock circuit 908 is closed. For example, as shown in FIG. 9, the power source 916 may be joined with the transmission conductor 302 of the mating connector 102. The power source 916 and transmission conductor 302 may be connected by one or more of the conductors 122 of the mating connector 102. The logic device 914 may switch off or direct the power source 916 to not transmit current to the transmission conductor 302 until the interlock circuit 908 is closed. As described above, the mating connector 102 may close the interlock circuit 908 when the mating connector 102 mates with the connector assembly 104. Waiting to begin supplying current to the mating connector 102 from the power source 916 may avoid delivering relatively high voltage current through the transmission conductor 302 until the transmission conductor 302 is mated with the connector assembly 104. The logic device 914 also may direct the power source 916 to stop delivering current to the transmission conductor 302 once the interlock circuit 908 is opened by the unmating of the mating connector 102 from the connector assembly 104.

When the mating connector 102 and connector assembly 104 mate, the transmission conductor 302 of the mating connector 102 is coupled with the input conductor 208 of the connector assembly 104. As shown in FIG. 9, the input conductor 208 can receive electric current from the power source 916 via the transmission conductor 302. The transmission conductor 302 may be an unfused conductive pathway in that no fuses are provided along the conductive pathway or pathways that connect the power source 916 with the transmission conductor 302 and the current supplied to the input conductor 208 does not pass through any fuses. As described above, the input conductor 208 splits into several conductive pathways 606, 608, 610. The current supplied by the power source 916 is split among the conductive pathways 606, 608, 610. Some of the current may be transmitted through the conductive pathway 606, across one of the fuses 524, and to one of the output conductors 210. Another portion of the current may be transferred through the conductive pathway 610, across a different fuse 524, and to a different output conductor 210.

In one embodiment, at least some of the current that is supplied to the input conductor 208 from the power source 916 via unfused conductive pathways of the mating connector 102 is transmitted back to the mating connector 102 through a fused circuit 922. The fused circuit 922 includes the fused conductive pathways 606, 610 and the fuses 524 in the illustrated embodiment. The addition of fuses 524 to the conductive pathways 606, 610 that feed the current back to the mating connector 102 may protect electrical loads 918, 920 that receive the current. For example, the loads 918, 920 may be joined with the mating connector 102 such that the loads 918, 920 are downstream from the connector assembly 104 along the path that current flows from the power source 916. The loads 918, 920 receive current that originated from the power source 916, passed through the mating connector 102 to the input conductor 208 of the connector assembly 104, through the fuses 524 and the output conductors 210 of the connector assembly 104, and to the loads 918, 920 via the input conductors 304 of the mating connector 102. The input conductors 304 may be joined with the loads 918, 920 by one or more conductors 122 of the mating connector 102.

Some of the current transmitted from the power source 916 to the input conductor 208 of the connector assembly 104 via the mating connector 102 may be transferred along the conductive pathway 608 of the input conductor 208 to the internal power conductor 124. The internal power conductor 124 may be joined with the loads 902, 904. The internal power conductor 124 may supply current to the loads 902, 904 from the input conductor 208. As shown in FIG. 9, the current supplied to the loads 902, 904 from the internal power conductor 124 may not have passed through any fuses between the power source 916 and the loads 902, 904. Alternatively, the internal power conductor 124 may be joined with one or more fuses through which the current to the loads 902, 904 passes.

As shown in FIG. 9, the loads 902, 904 may be connected to the negative conductor of the power source 916 of the module 900. The ground transfer conductors 308 of the mating connector 102 may be coupled with the loads 918, 920 by one or more conductors 122 of the mating connector 102. The ground transfer conductors 308 mate with the ground transfer conductors 214 of the connector assembly 104, as described above. The power source 916 is coupled with the ground feed conductor 306 of the mating connector 102 by one or more of the conductors 122. The ground feed conductor 306 mates with the ground feed conductor 212 of the connector assembly 104. As described above, the ground feed conductor 212 and the ground transfer conductors 214 are joined with the internal ground conductor 126, which is coupled with the power source 916. As a result, the ground feed conductor 212 and the ground transfer conductors 214 may connect the loads 918, 920 to the negative terminal of the power source 916.

As described herein, the connector assembly 104 receives electric potential and/or current from the mating connector 102 and conveys the potential and/or current through fuses 524 before transmitting the potential and/or current back to the mating connector 102 or to another component, such as the loads 902, 904. The mating connector 102 may use the potential and/or current to power one or more loads 918, 920. In such an embodiment, the connector assembly 104 provides or receives fused conductive pathways 606, 610 that may be used to protect the loads 918, 920 from power surges. Also, providing the fuses 524 in the connector assembly 104 may reduce the cost and/or size of the module 900 by eliminating or reducing the need for circuit boards in the module 900 and/or the need for additional components.

Figure 10:
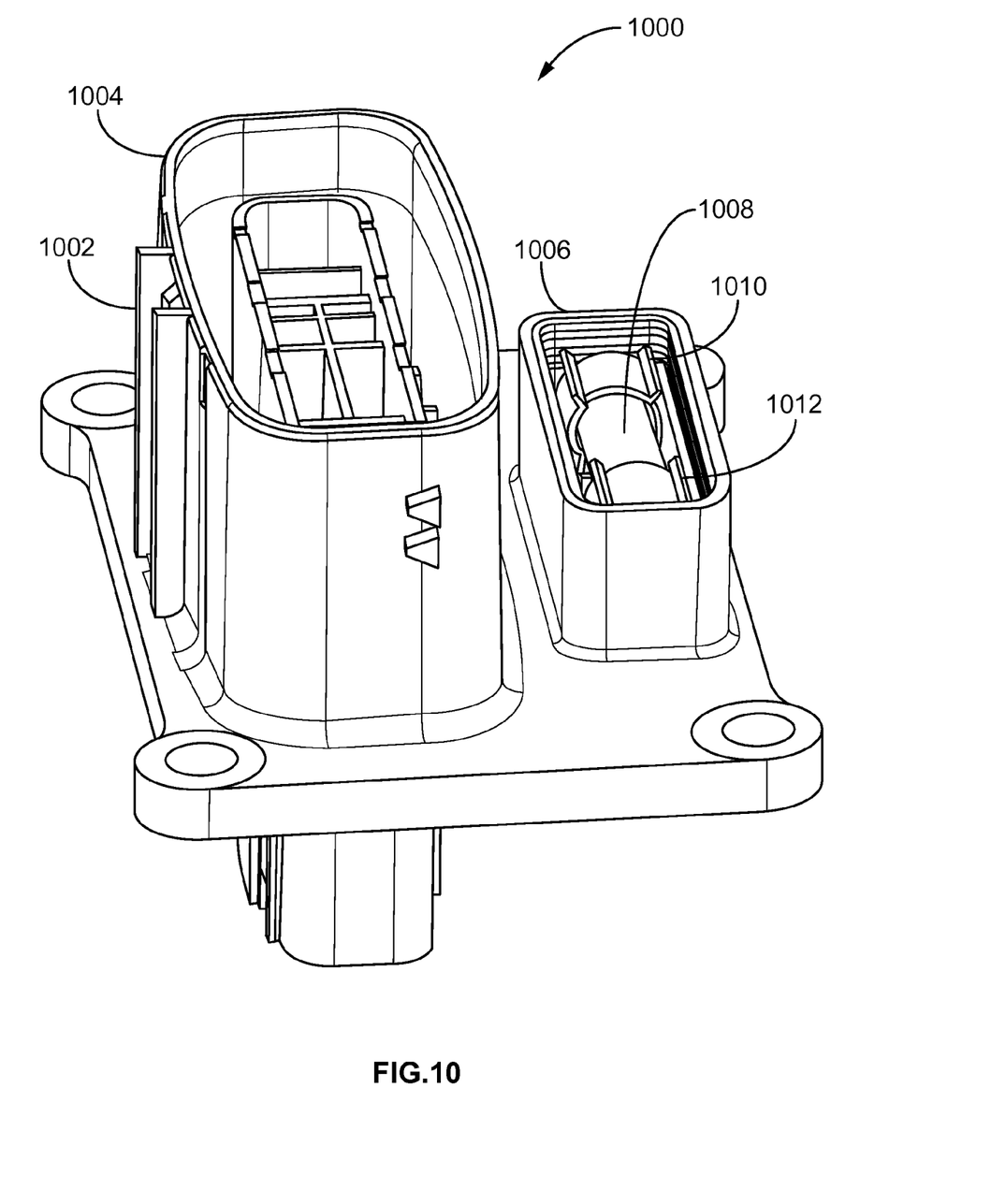
FIG. 10 is a perspective view of a connector assembly in accordance with another embodiment of the present disclosure.

FIG. 10 is a perspective view of a connector assembly 1000 in accordance with another embodiment of the present disclosure. The connector assembly 1000 may be similar to the connector assembly 104 (shown in FIG. 1). In one embodiment, the connector assembly 1000 is a header connector assembly that is mounted to the panel 106 (shown in FIG. 1) and mates with a mating connector such as the mating connector 102 (shown in FIG. 1). The connector assembly 1000 includes a housing 1002 that forms two shrouds 1004, 1006.

The shrouds 1004, 1006 forwardly project from the housing 1002 so that the shrouds 1004, 1006 extend from an exterior side of the panel 106 when the housing 1002 is mounted to the panel 106. The shroud 1004 mates with the mating connector 102 to couple the connector assembly 1000 with the mating connector 102. An electromagnetic shield (not shown) may be included within the housing 1002.

The shroud 1006 provides access to an internal fuse 1008. The fuse 1008 is similar to the fuse 524 (shown in FIG. 5). For example, the fuse 1008 may be joined with an input conductor 1010 and an output conductor 1012 within the shroud 1006 to electrically couple the input conductor 1010 with the output conductor 1012. Similar to the input conductor 208 (shown in FIG. 2) and the output conductor 210 (shown in FIG. 2), one end of each of the input and output conductors 1010, 1012 may be presented in the shroud 1004 in order to mate with corresponding conductors in the mating connector 102. For example, an end of the input conductor 1010 that is similar to the receiving end 600 (shown in FIG. 6) of the input conductor 208 and an end of the output conductor 1012 that is similar to the transmission end 700 (shown in FIG. 7) of the output conductor 210 may be presented in the shroud 1004. The opposite ends of the input and output conductors 1010, 1012 may be similar to the coupling end 522 (shown in FIG. 5) and the joining end 530 (shown in FIG. 5) of the input and output conductors 208, 210. The input and output conductors 1010, 1012 receive the fuse 1008 in the shroud 1006 to electrically couple the input and output conductors 1010, 1012 with one another. In one embodiment, the conductors 302, 304 (shown in FIG. 3) of the mating connector 102 may mate with the input and output conductors 1010, 1012 in the shroud 1004 in order to convey electric current from the conductor 302 of the mating connector 102, through the input conductor 1010 of the connector assembly 1000, across the fuse 1008 in the shroud 1006, through the output conductor 1012 of the connector assembly 1000, and back to the conductor 304 of the mating connector 102. The fuse 1008 provides a fused conductive pathway internal to the connector assembly 1000 over which the current passes.

A cover may be provided over the shroud 1006 to enclose the fuse 1008 within the shroud 1006. The placement of the fuse 1008 in the shroud 1006 may make it easier for a user to switch out the fuse 1008 with another fuse 1008. For example, instead of having to remove the connector assembly 1000 from the panel 106 (shown in FIG. 1), the user may remove the cover over the shroud 1006 and replace the fuse 1008 while keeping the connector assembly 1000 mounted to the panel 106. In one embodiment, the cover may include a shunt or conductive portion that closes an HVIL circuit, as described above.

Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:
    a housing configured to mate with a mating connector;
    an input conductor held in the housing, the input conductor extending between a receiving end and a coupling end, the receiving end configured to receive electric current from a power source, the coupling end configured to join with a fuse inside the housing; and
    an output conductor held in the housing, the output conductor extending between a transmission end and a joining end, the joining end configured to couple with the fuse inside the housing, the transmission end configured to convey the electric current to a first electric load, wherein the input conductor and the output conductor are electrically coupled with one another via the fuse to provide a fused conductive pathway within the connector assembly over which the electric current passes from the power source to the first electric load, wherein the housing includes interlock conductors that are configured to mate with a conductive body of the mating connector to close an interlock circuit that controls transmission of the electric current.

2. The connector assembly of claim 1, wherein the input conductor includes a supply end configured to be electrically coupled with a second electric load, the input conductor receiving the electric current through the receiving end and distributing the electric current among the coupling end and the supply end to transmit at least some of the electric current across the fuse to the output conductor and at least some of the electric current to the second electric load via the supply end.

3. The connector assembly of claim 1, wherein the housing extends between a front end and an opposite back end, the mating end configured to mate with a mating connector having a conductor that couples with the input conductor to convey the electric current to the input conductor or that couples with the output conductor to receive the electric current from the output conductor.

4. The connector assembly of claim 1, wherein the housing includes first and second connection bays that are each configured to mate with corresponding first and second mating connectors, the input conductor disposed in the first connection bay and configured to mate with a conductor in the first mating connector to receive the electric current, the output conductor disposed in the second connection bay and configured to mate with a conductor in the second mating connector to convey the electric current to the second mating connector.

5. The connector assembly of claim 1, wherein the housing is an outer housing, further comprising a conductive electromagnetic shield disposed in the outer housing and an inner housing disposed in the electromagnetic shield, the input conductor and the output conductor located within the inner housing.

6. The connector assembly of claim 1, wherein the housing includes two shrouds disposed on an exterior side of the panel when the housing is mounted to the panel, wherein the first shroud mates with the mating connector and the second shroud receives the fuse.

7. The connector assembly of claim 1, wherein at least one of the input conductor and the output conductor is a bus bar.

8. The connector assembly of claim 1, wherein the housing extends between a mating end and an opposite back end, the mating end projecting from an exterior side of the panel and the back end disposed on an opposite side of the panel, the input conductor and the output conductor disposed between the mating end and the back end and configured to be coupled by the fuse between the mating end and the back end.

9. The connector assembly of claim 1, wherein the coupling end of the input conductor is a first coupling end and the output conductor is a first output conductor, further comprising a second coupling end of the input conductor and a second output conductor, the second coupling end and the second output conductor each configured to join with a fuse to electrically connect the second coupling end with the second output conductor.

10. A connector assembly comprising:
a housing configured to mate with a mating connector;
an input conductor held in the housing, the input conductor extending between opposite ends, one of the opposite ends including a receiving end and the other end including a coupling end and a supply end, the receiving end configured to receive electric current from a power source, the coupling end configured to join with a fuse inside the housing, the supply end configured to be electrically coupled with a first electric load; and
an output conductor held in the housing, the output conductor extending between a transmission end and a joining end, the joining end configured to couple with the fuse inside the housing, the transmission end configured to convey the electric current to a second electric load, wherein the input conductor and the output conductor are electrically coupled with one another via the fuse, the input conductor splitting the electric current from the power source between the first electric load and the second electric load, wherein a portion of the electric current that flows through the input conductor to the first electric load flows via the supply end without passing through the fuse, and a portion of the electric current that flows through the input conductor to the second electric load flows through the fuse and the output conductor.

11. The connector assembly of claim 10, wherein the input conductor and the output conductor provide a fused conductive pathway within the housing over which at least some of the electric current passes from the power source to the second electric load and the input conductor provides an unfused conductive pathway within the housing over which at least some of the electric current passes from the power source to the first electric load.

12. The connection assembly of claim 10, wherein the housing includes interlock conductors that are configured to be closed to close an interlock circuit that controls transmission of the electric current.

13. The connector assembly of claim 10, wherein the housing extends between a mating end and an opposite back end, the mating end configured to mate with the mating connector having a conductor that couples with the input conductor to convey the electric current to the input conductor or with the output conductor to receive the electric current from the output conductor.

14. The connector assembly of claim 10, wherein the housing includes first and second connection bays that are each configured to mate with corresponding first and second mating connectors, the input conductor disposed in the first connection bay and configured to mate with a conductor in the first mating connector to receive the electric current, the output conductor disposed in the second connection bay and configured to mate with a conductor in the second mating connector to convey the electric current to the second mating connector.

15. The connector assembly of claim 10, wherein the housing is an outer housing, further comprising a conductive electromagnetic shield disposed in the outer housing and an inner housing disposed in the electromagnetic shield, the input conductor and the output conductor located within the inner housing.

16. The connector assembly of claim 10, wherein at least one of the input conductor and the output conductor is a bus bar.

17. The connector assembly of claim 10, wherein the coupling end of the input conductor is a first coupling end and the output conductor is a first output conductor, further comprising a second coupling end of the input conductor and a second output conductor, the second coupling end and the second output conductor each configured to join with a fuse to electrically connect the second coupling end with the second output conductor.

18. The connector assembly of claim 10, wherein the housing includes a connection bay and a shroud disposed on an exterior side of the panel when the housing is mounted to the panel, the connection bay including at least one of the receiving end of the input conductor and the transmission end of the output conductor, the shroud including the coupling end of the input conductor and the joining end of the output conductor, the connection bay configured to mate with a mating connector having one or more conductors that couple with the at least one of the receiving end of the input conductor and the transmission end of the output conductor, the shroud configured to receive the fuse from outside of the panel.

19. The connector assembly of claim 18, wherein the connection bay mates with the mating connector and the shroud receives the fuse from the exterior side of the panel.

* * * * *